United States Patent
Ikoma

(10) Patent No.: US 7,275,515 B2
(45) Date of Patent: Oct. 2, 2007

(54) CONTROL DEVICE FOR INTERNAL COMBUSTION ENGINE

(75) Inventor: Takuya Ikoma, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/369,040

(22) Filed: Mar. 7, 2006

(65) Prior Publication Data
US 2006/0207551 A1    Sep. 21, 2006

(30) Foreign Application Priority Data
Mar. 18, 2005  (JP)  ............... 2005-078323

(51) Int. Cl.
F02B 1/08    (2006.01)
F02D 41/30   (2006.01)
F01L 1/34    (2006.01)

(52) U.S. Cl. .................. 123/305; 123/90.15; 123/299; 123/431; 123/478

(58) Field of Classification Search ............. 123/90.11, 123/90.15, 294–305, 431, 478
See application file for complete search history.

(56) References Cited

U.S. PATENT DOCUMENTS 5,233,956 A * 8/1993 Ueda et al. ................. 123/302
5,775,288 A * 7/1998 Suzuki et al. ............... 123/298

FOREIGN PATENT DOCUMENTS

| JP | A 10-317972  | 12/1998 |
| JP | A 11-030143  | 2/1999  |
| JP | A 2001-050083 | 2/2001  |
| JP | A 2002-202039 | 7/2002  |
| JP | A 2002-332888 | 11/2002 |
| JP | A 2003-254199 | 9/2003  |
| JP | A 2004-316538 | 11/2004 |

* cited by examiner

Primary Examiner—T. M. Argenbright
(74) Attorney, Agent, or Firm—Oliff & Berridge, PLC

(57) ABSTRACT

An in-cylinder injector injects fuel to be sprayed in the form of an inverted letter V sandwiching a spark plug, as seen in a top view, and in a sector as seen in a side view. The sprayed fuel interferes with an intake valve assuming an open position. An engine ECU executes a program including the steps of: determining with reference to a map a timing of injection of the fuel through the in-cylinder injector (S100); determining a period for injection from an amount of fuel injected (S110); determining in accordance with map whether the sprayed fuel interferes with the intake valve (S120); modifying the period for injection to be advanced by a period for injection having the sprayed fuel interfering with the intake valve (S130); and determining a timing of injection and a period for injection (S140).

22 Claims, 10 Drawing Sheets

F I G. 2
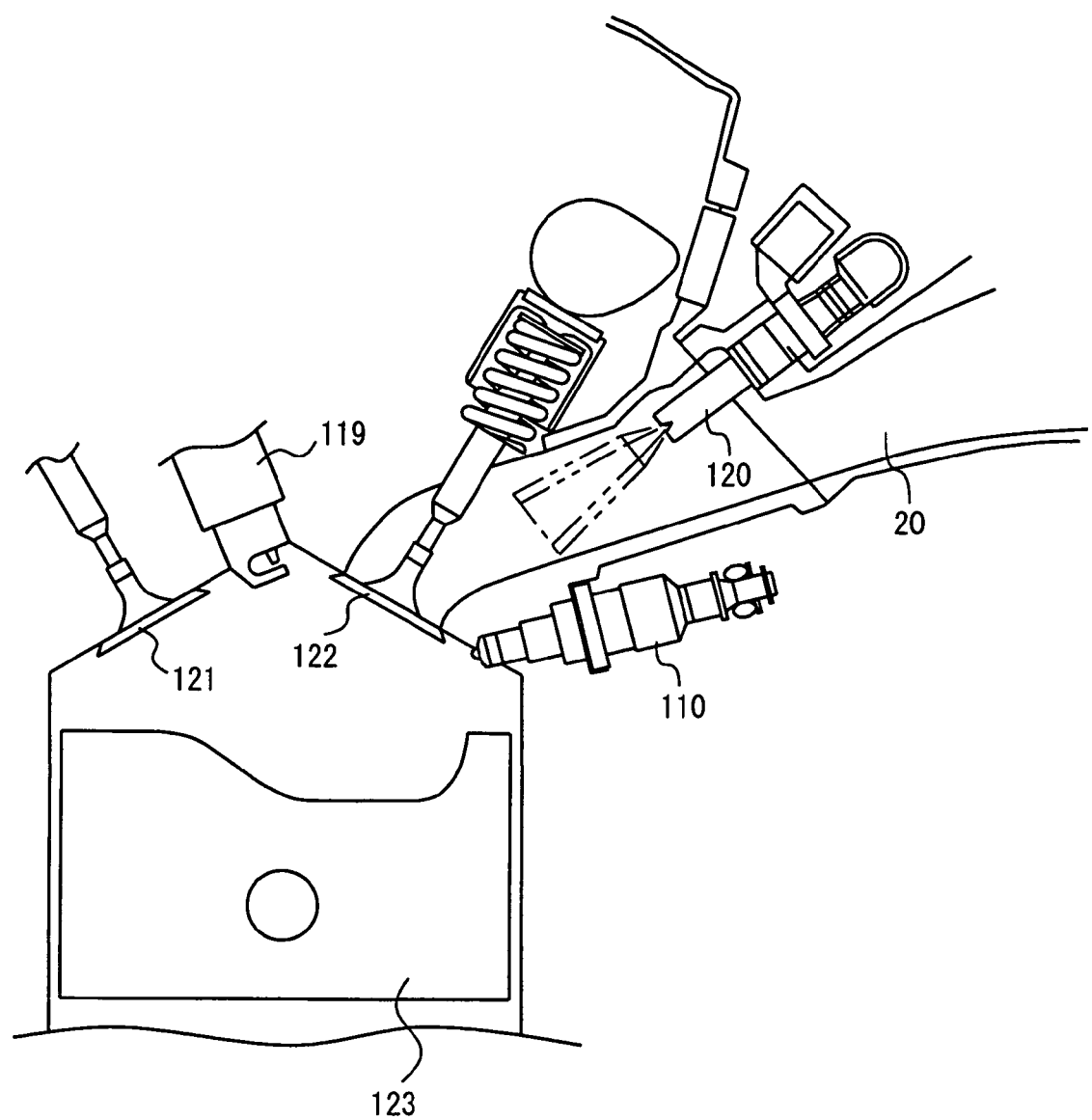

500A  500B

CONTROL DEVICE FOR INTERNAL COMBUSTION ENGINE

This nonprovisional application is based on Japanese Patent Application No. 2005-078323 filed with the Japan Patent Office on Mar. 18, 2005, the entire contents of which are hereby incorporated by reference.

BACKGROUND OF THE INVENTION

1. Field of the Invention

The present invention relates to an internal combustion engine for a vehicle, and more particularly to an internal combustion engine that includes at least a first fuel injection mechanism (in-cylinder injector) for injecting a fuel into a cylinder and further includes a second fuel injection mechanism (intake manifold injector) for injecting a fuel into an intake manifold or an intake port.

2. Description of the Background Art

An internal combustion engine provided with an intake manifold injector for injecting a fuel into an intake manifold and an in-cylinder injector for injecting a fuel into a combustion chamber, in which fuel injection from the intake manifold injector is stopped when load of the engine is lower than preset load and fuel injection from the intake manifold injector is allowed when load of the engine is higher than the preset load, is known.

An in-cylinder injection type engine aiming at improvement in combustion efficiency and purification of exhaust gas by making smaller particles of fuel injected into the cylinder represents one example of techniques related to such an in-cylinder injector in an internal combustion engine. For example, Japanese Patent Laying-Open No. 2003-254199 discloses an in-cylinder fuel injection type internal combustion engine that achieves ensured improvement in fuel efficiency by permitting setting of a high compression ratio even when an average air-fuel ratio of the whole air-fuel mixture in a cylinder bore is high and when the air-fuel mixture is lean on the average such as in a low load state of the internal combustion engine. In the in-cylinder fuel injection type internal combustion engine, an intake manifold is formed on one side of a cylinder head, whereas an exhaust manifold is formed on the other side thereof when the cylinder in which an axial center of the cylinder bore is aligned with a vertical line is viewed from a side. The in-cylinder fuel injection type internal combustion engine includes a fuel injection valve capable of injecting the fuel in an obliquely downward direction from an end side on one side of the cylinder head into the cylinder bore and a spark plug of which discharge portion is exposed within the cylinder bore substantially on the axial center of the cylinder bore. In the in-cylinder fuel injection type internal combustion engine, when the cylinder is viewed two-dimensionally, the fuel injected from the fuel injection valve is in an inverted V-shape with the discharge portion lying between two prongs, and the fuel is injected from the fuel injection valve in an intake stroke.

According to the in-cylinder fuel injection type internal combustion engine, the fuel injected from the fuel injection valve is in an inverted V-shape with the discharge portion lying between the two prongs. In addition, in the intake stroke of the internal combustion engine, the piston is lowered from the top dead center. This direction of lowering is the same as the direction of injection of the fuel from the fuel injection valve. Therefore, the fuel injected from the fuel injection valve travels along each outer side of the discharge portion. Here, furious collision of the fuel with an upper surface of the piston is prevented, and the fuel smoothly travels in a direction of injection. When forward ends of respective injected fuel prongs on the left and right reach an inner circumferential surface of the cylinder bore and the upper surface of the piston, the fuels are guided by these surfaces so that some part of the fuels comes closer to each other in a circumferential direction of the cylinder bore, while other part thereof moves away from each other in the circumferential direction of the cylinder bore. Then, in the intake stroke and the following compression stroke, most of the fuel injected into the cylinder bore is concentrated in an area in the vicinity of the inner circumferential surface of the cylinder bore substantially uniformly in the circumferential direction. Namely, when the cylinder is viewed two-dimensionally, a stratified, ring-shaped rich air-fuel mixture substantially around the axial center of the cylinder bore and a stratified, lean air-fuel mixture surrounded by the stratified rich air-fuel mixture and located in the vicinity of the discharge portion are formed in the cylinder bore.

If the fuel injection valve characterized by spraying fuel in a form in a direction as described in Japanese Patent Laying-Open No. 2003-254199 is used to inject fuel at the intake stroke, for which the intake valve is lifted, a portion of the injected fuel adheres on a back side of the flared head of the intake valve and forms droplets and thus flows in. This prevents the cylinder from having an air fuel mixture formed therein and as a result the internal combustion engine emits more uncombusted fuel (HC). Accordingly, Japanese Patent Laying-Open No. 2004-316538 discloses a direct injection, spark ignited internal combustion engine contemplated to prevent an increased amount of uncombusted fuel emitted as fuel sprayed adheres to a back side of the flared head of the intake valve when the fuel is injected at the intake stroke. This internal combustion engine is a direct injection, spark ignited internal combustion engine that has a combustion chamber having a side portion provided with a fuel injection valve injecting fuel between two intake valves toward the center of the combustion chamber. While the internal combustion engine includes an air motion device allowing air flowing into the combustion chamber via the intake valve to be sprayed to a back side of the flared head of the intake valve that is closer to the center of the combustion chamber, the internal combustion engine includes means calculating a period of time that allows the valve to be lifted to allow the fuel sprayed through the fuel injection valve to adhere to the back side of the flared head of the intake valve that is closer to the center of the combustion engine and to also prevent the sprayed fuel from adhering to the back side of the flared head of the intake valve that is closer to a wall surface of the combustion chamber, and means controlling injecting the fuel, as based on the information of the period of time, in a mode of operation allowing the fuel to be injected at the intake stroke.

In this internal combustion engine at the intake stroke the sprayed fuel interferes with the intake valve only at the back side of the flared head of the intake valve that is closer to the center of the combustion engine and the fuel having adhered (or adhering) thereto can be blown away by a stream of air intensified by the air motion device. The fuel can thus be utilized to form an air fuel mixture in the cylinder to contribute to a reduced amount of uncombusted fuel emitted.

As disclosed in Japanese Patent Laying-Open No. 2004-316538, however, injecting fuel is controlled as based on a period of time allowing the valve to be lifted in an amount that prevents the fuel sprayed through the fuel injection valve from adhering to the back side of the flared head of the intake valve that is closer to a wall surface of the combustion chamber. As such, the fuel is injected for a reduced period of time. As a result, an amount of fuel required may not be injected or an air fuel mixture reduced in homogeneity may be provided resulting in unsteady combustion or the like.

Furthermore, if the fuel sprayed through the fuel injection valve scatters along the back side of the flared head of the intake valve toward the spark plug, the spark plug is covered with the fuel and as a result smolders and can fail to normally spark.

SUMMARY OF THE INVENTION

The present invention contemplates a control device for an internal combustion engine having a fuel injection mechanism injecting fuel into a cylinder that can prevent the internal combustion engine from being impaired in performance and can resolve a disadvantage caused by injecting fuel through the fuel injection mechanism at the intake stroke.

The present control device controls an internal combustion engine including a fuel injection mechanism injecting fuel into a cylinder. The present control device includes: an injection controller controlling the fuel injection mechanism to inject the fuel into the cylinder at an intake stroke, as corresponding to a prescribed state of operation associated with the internal combustion engine; a valve controller controlling at least one of a timing to open and close an intake valve, a period of time for which the intake valve is opened/closed, and the intake valve's liftability; a determinator determining whether the fuel injected through the fuel injection mechanism and thus sprayed interferes with the intake valve and scatters in a vicinity of a spark plug; and a modifier operative in response to the determinator making a decision that the fuel has scattered in the vicinity of the spark plug to allow the injection controller to modify a manner of injecting the fuel and/or to allow the valve controller to modify a manner of operating the intake valve to prevent the fuel sprayed from interfering with the intake valve.

In accordance with the present invention for example to allow a combustion chamber to have therein an air fuel mixture improved in a homogeneity a fuel injection mechanism in one example implemented by an in-cylinder injector injects fuel spreading in the form of an inverted letter V covering a spark plug as seen along a line extending in the direction of the piston's reciprocation (i.e. as seen in a plan view of the cylinder) and also in a sector as seen in a direction perpendicular to the line (i.e., in a side view of the cylinder). If the injected fuel is sprayed in such form, and the in-cylinder injector injects fuel at the intake stroke, the fuel interferes with the intake valve and scatters along a back side of the flared head of the intake valve toward the spark plug. This tendency is remarkably occurs for low rotation and low load providing a small amount of intake air and a weak air flow. If the spark plug has fuel scattering thereon, the spark plug may smolder and be covered with fuel in the form of liquid and thus incapable of normally spark. Accordingly if the determinator determines that the fuel has scattered in the vicinity of the spark plug, a timing of injection of the fuel, a period for injecting the fuel (or an amount of fuel to be injected), a timing to open the intake valve, the intake valve's liftability, and/or the like is/are modified to prevent the in-cylinder injector from injecting and thus spraying fuel at the intake stroke to interfere with the intake valve. This can prevent the fuel from scattering in a vicinity of the spark plug. As a result a control device for an internal combustion engine including a fuel injection mechanism injecting fuel into a cylinder can be provided that can prevent the internal combustion engine from being impaired in performance and overcome a disadvantage caused as the fuel injection mechanism injects fuel at the intake stroke.

Preferably the modifier allows the injection controller to modify a timing of injection of the fuel to modify the manner of injecting the fuel.

In accordance with the present invention if the determinator determines that the fuel has scattered in a vicinity of the spark plug, the in-cylinder injector can be timed to inject the fuel earlier, e.g., before the intake valve opens or the intake valve descends to a position allowing the fuel to interfere with the valve. Thus the interference of the fuel with the valve can thus be avoided. Note that the in-cylinder injector may be timed to inject the fuel later is such can resolve the interference and also allows the internal combustion engine to exhibit desired performance.

Still preferably the modifier advances the timing of injection of the fuel.

In accordance with the present invention if the determinator determines that the fuel has scattered in a vicinity of the spark plug, the in-cylinder injector can be timed to inject the fuel earlier to prevent the fuel from interfering with the intake valve.

Still preferably the modifier allows the injection controller to divide injecting the fuel at least in two times to modify the manner of injecting the fuel.

In accordance with the present invention for example before the intake valve opens or descends to the position allowing the fuel to interfere with the intake valve a first injection of fuel can be effected and after the intake valve is closed or ascends above the position a second injection of fuel can be effected to avoid the interference. Note that the frequency of injecting the fuel is not limited to twice.

Still preferably the modifier allows the injection controller to reduce a period for injecting the fuel and if reducing the period results in failing to satisfy an amount of fuel required then the modifier modifies the manner of injecting the fuel by allowing the fuel injection mechanism injecting the fuel into the intake manifold to inject fuel by a shortfall.

In accordance with the present invention, for example, before the intake valve opens or descends to the position allowing the fuel to interfere with the intake valve, injecting the fuel is completed, or after the intake valve is closed or ascends above the position, injecting the fuel is started (i.e., the fuel is injected for a reduced period of time) to avoid the interference. If the fuel is injected in an insufficient amount (an amount of fuel required<that of fuel injected through the in-cylinder injector+that of fuel injected through the intake manifold injector), then the shortfall can be injected through the intake manifold injector to supply the internal combustion engine with the amount of fuel required.

Still preferably the fuel injection mechanism injecting the fuel into the cylinder is an in-cylinder injector and the fuel injection mechanism injecting the fuel into the intake manifold is an intake manifold injector.

In accordance with the present invention a control device for an internal combustion engine having an in-cylinder injector serving as a fuel injection mechanism injecting fuel into a cylinder and an intake manifold injector injecting fuel into an intake manifold provided separately to have the injectors bearing shares, respectively, of injecting the fuel, can be provided that can prevent the internal combustion engine from being impaired in performance and overcome a disadvantage caused as the fuel injection mechanism injects fuel at the intake stroke.

Still preferably the modifier allows the valve controller to modify the timing to open and close the intake valve to modify the manner of injecting the fuel.

In accordance with the present invention if the determinator determines that the fuel has scattered in a vicinity of the spark plug, the intake valve can be timed to open later, e.g., after a period for injecting the fuel through the in-cylinder injector completes or when a period for injecting the fuel completes before the intake valve opened reaches the position allowing the fuel to interfere with the valve. The interference of the fuel with the valve can thus be avoided. Note that the intake valve may be timed to open earlier if such can resolve the interference and also allows the internal combustion engine to exhibit desired performance.

Still preferably the modifier allows the intake valve to be timed to open later.

In accordance with the present invention if the determinator determines that the fuel has scattered in a vicinity of the spark plug the intake valve can be timed to open later to prevent fuel from interfering with the valve.

Still preferably the determinator determines whether the fuel sprayed has scattered in the vicinity of the spark plug with reference to a map represented by a parameter representing a state of operation of the internal combustion engine.

In accordance with the present invention whether injected fuel has scattered in a vicinity of the spark plug can be determined with reference to a previously created map of interference with the intake valve of fuel injected through the in-cylinder injector at the intake stroke, with the internal combustion engine's speed, load factor and the like serving as parameters.

Still preferably an electrical characteristic of the spark plug is detected and if the electrical characteristic varies from a normal state the determinator determines whether the fuel sprayed has scattered in the vicinity of the spark plug.

In accordance with the present invention if the spark plug has fuel adhering thereto the spark plug smolders and is thus soiled and damaged, and for example its two electrodes have a reduced value in (insulation) resistance. From the fact that the resistance, serving as an electrical characteristic, varies from a normal value, a decision can be made that the injected fuel has scattered in a vicinity of the spark plug.

Still preferably the modifier modifies at least one of the manner of injecting the fuel and the manner of operating the intake valve until the electrical characteristic no longer varies, as detected.

In accordance with the present invention if for example the spark plug smolders, its two electrodes have a reduced value in (insulation) resistance. If for each cycle the resistance, serving as an electrical characteristic, varies from a normal value, a decision is made that the injected fuel scatters in a vicinity of the spark plug, and accordingly, the in-cylinder injector injects fuel in a modified manner or the intake valve is operated in a modified manner. If the interference of the fuel with the intake valve is resolved, the value in resistance gradually recovers a normal state. Until the value in resistance recovers the normal state (i.e., the electrical characteristic no longer varies, as detected) the manners are repeated modified. Thus the spark plug can be prevented from smoldering.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a partially enlarged view of FIG. 1.

DESCRIPTION OF THE PREFERRED EMBODIMENTS

Figure 1:
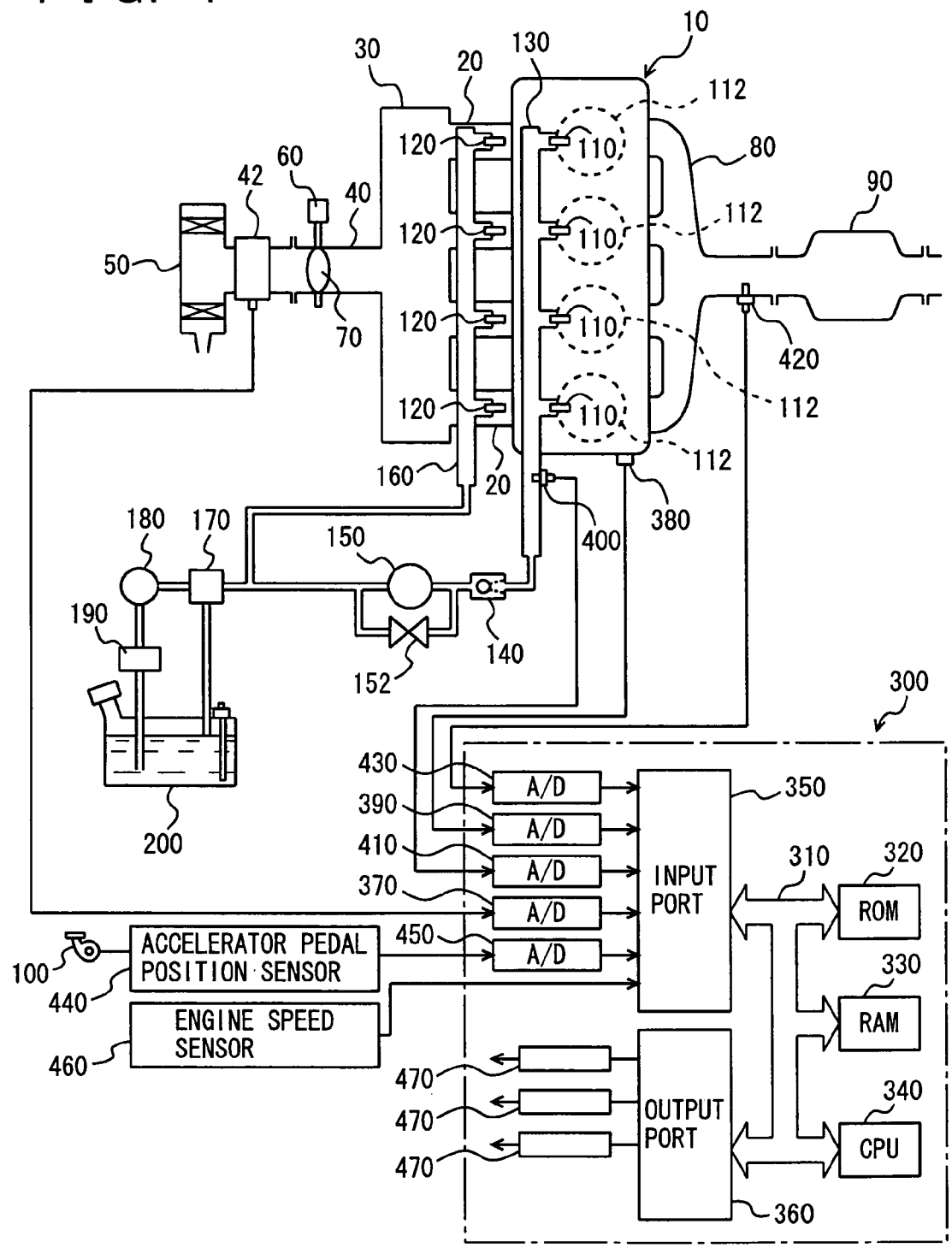
FIG. 1 is a schematic configuration diagram of an engine system controlled by a control device according to an embodiment of the present invention.

An embodiment of the present invention will be described hereinafter with reference to the drawings. The same elements have the same reference characters allotted. Their label and function are also identical. Therefore, detailed description thereof will not be repeated.

FIG. 1 schematically shows a configuration of an engine system controlled by an engine ECU (Electronic Control Unit) that is a control device of an internal combustion engine according to an embodiment of the present invention. Although an in-line 4-cylinder gasoline engine is shown in FIG. 1, application of the present invention is not restricted to the engine shown, and the engine may be a V-type 6-cylinder engine, a V-type 8-cylinder engine and an in-line 6-cylinder engine. In addition, though an engine having an in-cylinder injector and an intake manifold injector will be described hereinafter, the present invention is applicable to any engine having at least an in-cylinder injector.

As shown in FIG. 1, an engine 10 includes four cylinders 112, which are connected via corresponding intake manifolds 20 to a common surge tank 30. Surge tank 30 is connected via an intake duct 40 to an air cleaner 50. In intake duct 40, an airflow meter 42 and a throttle valve 70, which is driven by an electric motor 60, are disposed. Throttle valve 70 has its opening position controlled based on an output signal of an engine ECU (Electronic Control Unit) 300, independently of an accelerator pedal 100. Cylinders 112 are connected to a common exhaust manifold 80, which is in turn connected to a three-way catalytic converter 90.

For each cylinder 112, an in-cylinder injector 110 for injecting fuel into the cylinder and an intake manifold injector 120 for injecting fuel into an intake port and/or an intake manifold are provided. These injectors 110, 120 are controlled based on output signals of engine ECU 300.

In-cylinder injectors 110 are connected to a common fuel delivery pipe 130. Fuel delivery pipe 130 is connected to a high-pressure fuel pump 150 of an engine driven type via a check valve 140 that allows flow toward fuel delivery pipe 130. In the present embodiment, description will be made as to the internal combustion engine having two injectors provided separately, although the present invention is not limited thereto. For example, the internal combustion engine may have a single injector capable of performing both in-cylinder injection and intake manifold injection.

As shown in FIG. 1, the discharge side of high-pressure fuel pump 150 is connected to the intake side of high-pressure fuel pump 150 via an electromagnetic spill valve 152. It is configured such that the quantity of the fuel supplied from high-pressure fuel pump 150 to fuel delivery pipe 130 increases as the degree of opening of electromagnetic spill valve 152 is smaller, and that fuel supply from high-pressure fuel pump 150 to fuel delivery pipe 130 is stopped when electromagnetic spill valve 152 is fully opened. Electromagnetic spill valve 152 is controlled based on an output signal of engine ECU 300.

Meanwhile, intake manifold injectors 120 are connected to a common fuel delivery pipe 160 on the low-pressure side. Fuel delivery pipe 160 and high-pressure fuel pump 150 are connected to a low-pressure fuel pump 180 of an electric motor driven type via a common fuel pressure regulator 170. Further, low-pressure fuel pump 180 is connected to a fuel tank 200 via a fuel filter 190. Fuel pressure regulator 170 is configured to return a part of the fuel discharged from low-pressure fuel pump 180 to fuel tank 200 when the pressure of the fuel discharged from low-pressure fuel pump 180 becomes higher than a preset fuel pressure. This prevents the pressure of the fuel supplied to intake manifold injectors 120 as well as the pressure of the fuel supplied to high-pressure fuel pump 150 from becoming higher than the preset fuel pressure.

Engine ECU 300 is configured with a digital computer, which includes a ROM (Read Only Memory) 320, a RAM (Random Access Memory) 330, a CPU (Central Processing Unit) 340, an input port 350, and an output port 360, which are connected to each other via a bidirectional bus 310.

Airflow meter 42 generates an output voltage that is proportional to an intake air quantity, and the output voltage of airflow meter 42 is input via an A/D converter 370 to input port 350. A coolant temperature sensor 380 is attached to engine 10, which generates an output voltage proportional to an engine coolant temperature. The output voltage of coolant temperature sensor 380 is input via an A/D converter 390 to input port 350.

A fuel pressure sensor 400 is attached to fuel delivery pipe 130, which generates an output voltage proportional to a fuel pressure in fuel delivery pipe 130. The output voltage of fuel pressure sensor 400 is input via an A/D converter 410 to input port 350. An air-fuel ratio sensor 420 is attached to exhaust manifold 80 located upstream of three-way catalytic converter 90. Air-fuel ratio sensor 420 generates an output voltage proportional to an oxygen concentration in the exhaust gas, and the output voltage of air-fuel ratio sensor 420 is input via an A/D converter 430 to input port 350.

Air-fuel ratio sensor 420 in the engine system of the present embodiment is a full-range air-fuel ratio sensor (linear air-fuel ratio sensor) that generates an output voltage proportional to an air-fuel ratio of the air-fuel mixture burned in engine 10. As air-fuel ratio sensor 420, an O2 sensor may be used which detects, in an on/off manner, whether the air-fuel ratio of the mixture burned in engine 10 is rich or lean with respect to a theoretical air-fuel ratio.

Accelerator pedal 100 is connected to an accelerator position sensor 440 that generates an output voltage proportional to a degree of press-down of accelerator pedal 100. The output voltage of accelerator position sensor 440 is input via an A/D converter 450 to input port 350. An engine speed sensor 460 generating an output pulse representing the engine speed is connected to input port 350. ROM 320 of engine ECU 300 prestores, in the form of a map, values of fuel injection quantity that are set corresponding to operation states based on the engine load factor and the engine speed obtained by the above-described accelerator position sensor 440 and engine speed sensor 460, respectively, and the correction values based on the engine coolant temperature.

FIG. 2 is a partially enlarged view of FIG. 1. FIG. 2 illustrates positional relation of in-cylinder injector 110 and intake manifold injector 120 in each cylinder 112 shown in FIG. 1 as well as positional relation of intake manifold 20, an intake valve 122, an exhaust valve 121, a spark plug 119, and a piston 123.

Intake valve 122 is provided on the combustion chamber side of intake manifold 20, and intake manifold injector 120 is arranged upstream of intake valve 122. Intake manifold injector 120 injects the fuel toward an inner wall of intake manifold 20 that serves as an intake air passage.

An example of a direction of fuel injection from intake manifold injector 120 may be as follows.

PM (Particulate Matter) within the combustion chamber flows back to intake manifold 20 due to overlap between intake valve 122 and exhaust valve 121, and the fuel injected from intake manifold injector 120 is sprayed toward the inner wall of intake manifold 20. Then, particulate fuel serves as an adhesive and may remain as deposits on the inner wall of intake manifold 20 on a side close to intake valve 122. The direction of fuel injection from intake manifold injector 120 is set to a direction toward the deposits, so that the deposits can be washed away by the fuel injected from the intake manifold injector 120.

In intake manifold 20, a component for forming a vortex flow in the combustion chamber such as a swirl control valve is not provided. If such a swirl control valve is provided, the flow coefficient is lowered and air in an amount necessary and sufficient at the time of WOT cannot flow into the combustion chamber. In the internal combustion engine according to the present embodiment, however, a higher flow coefficient is set so as to implement a high flow rate port. It is noted that a tangential type intake port may be provided, so long as a high flow rate can be achieved. The tangential type port does not have such a spiraling shape around intake valve 122 as swinging to the left and right but extends straight and has an arcing end portion swinging up and down along a large arc. Therefore, resistance to flow within the intake port is small, and the flow coefficient of the intake port is much greater than that of the swirl port. Namely, volumetric efficiency is higher, and a large amount of air can be suctioned into the combustion chamber. Preferably, a flow coefficient Cf of the intake port is set to a value of 0.5 to 0.7 or higher.

As shown in FIG. 2, a recess having a gently curved contour is provided in the top portion of piston 123 opposite to in-cylinder injector 110. The fuel is injected from in-cylinder injector 110 toward the recess. As the top portion of piston 123 opposing in-cylinder injector 110 does not have a corner portion, the spray formed by the fuel injected from in-cylinder injector 110 is not divided by the corner portion. If the sprayed fuel is divided, a local rich state may be caused. Such a state, however, can be avoided. Note that the top portion of piston 123 is not limited to such a geometry as described above. Furthermore, it is noted that detailed description of the shape of the fuel sprayed from in-cylinder injector 110 will be given later. Moreover, a ratio of fuel injection between in-cylinder injector 110 and intake manifold injector 120 arranged as shown in FIG. 2 will be described in detail later.

Figure 3A:
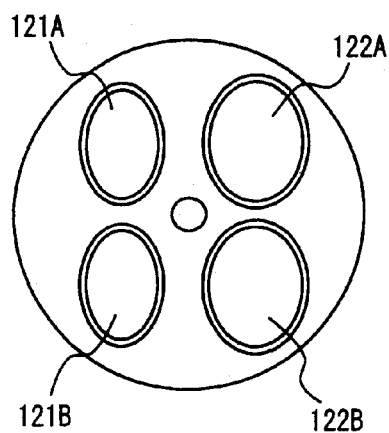
FIG. 3A shows an arrangement of intake and exhaust valves.
Figure 3B:
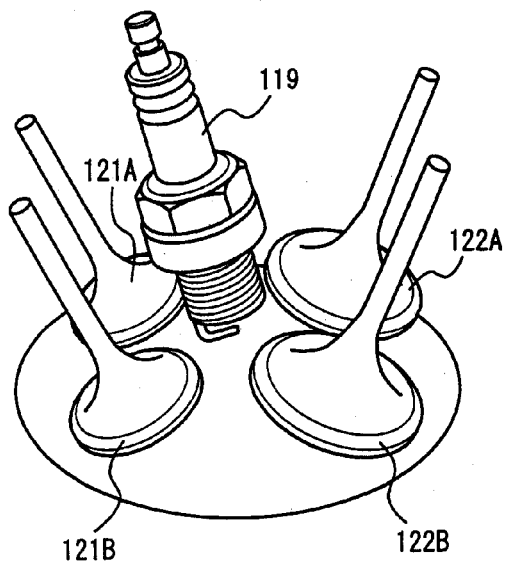
FIG. 3B is a perspective view of an arrangement of intake and exhaust valves.

Referring to FIGS. 3A and 3B, intake valve 122 and exhaust valve 121 will be described. As shown in FIGS. 3A and 3B, engine 10 includes two intake valves 122 (a first intake valve 122A and a second intake valve 122B) and two exhaust valves 121 (a first exhaust valve 121A and a second exhaust valve 121B).

Spark plug 119 is provided around the center of an area surrounded by four valves. In-cylinder injector 110 is provided between intake valve 122A and intake valve 122B.

Figure 4:
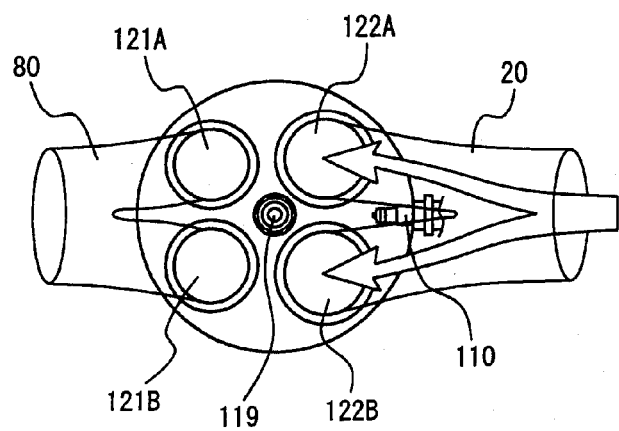
FIG. 4 is a cross-sectional view of intake and exhaust valves of an engine viewed from above.

FIG. 4 is a cross-sectional view of engine 10 viewed from above. Intake manifold 20 is divided into two branches upstream of a point of connection with the cylinder head, the number of branches corresponding to the number of intake valves 122. Intake air that flows through intake manifold 20 is introduced into the cylinder through intake valve 122A and intake valve 122B.

The exhaust resulting from combustion in the combustion chamber is sent to exhaust manifold 80 through exhaust valve 121A and exhaust valve 121B. In this case as well, exhaust manifolds 80 are merged into one immediately downstream of the point of connection with the cylinder head. In addition, exhaust manifolds 80 in four respective cylinders are merged into one.

As shown in FIG. 4, in-cylinder injector 110 is provided between intake valve 122A and intake valve 122B.

Figure 5:
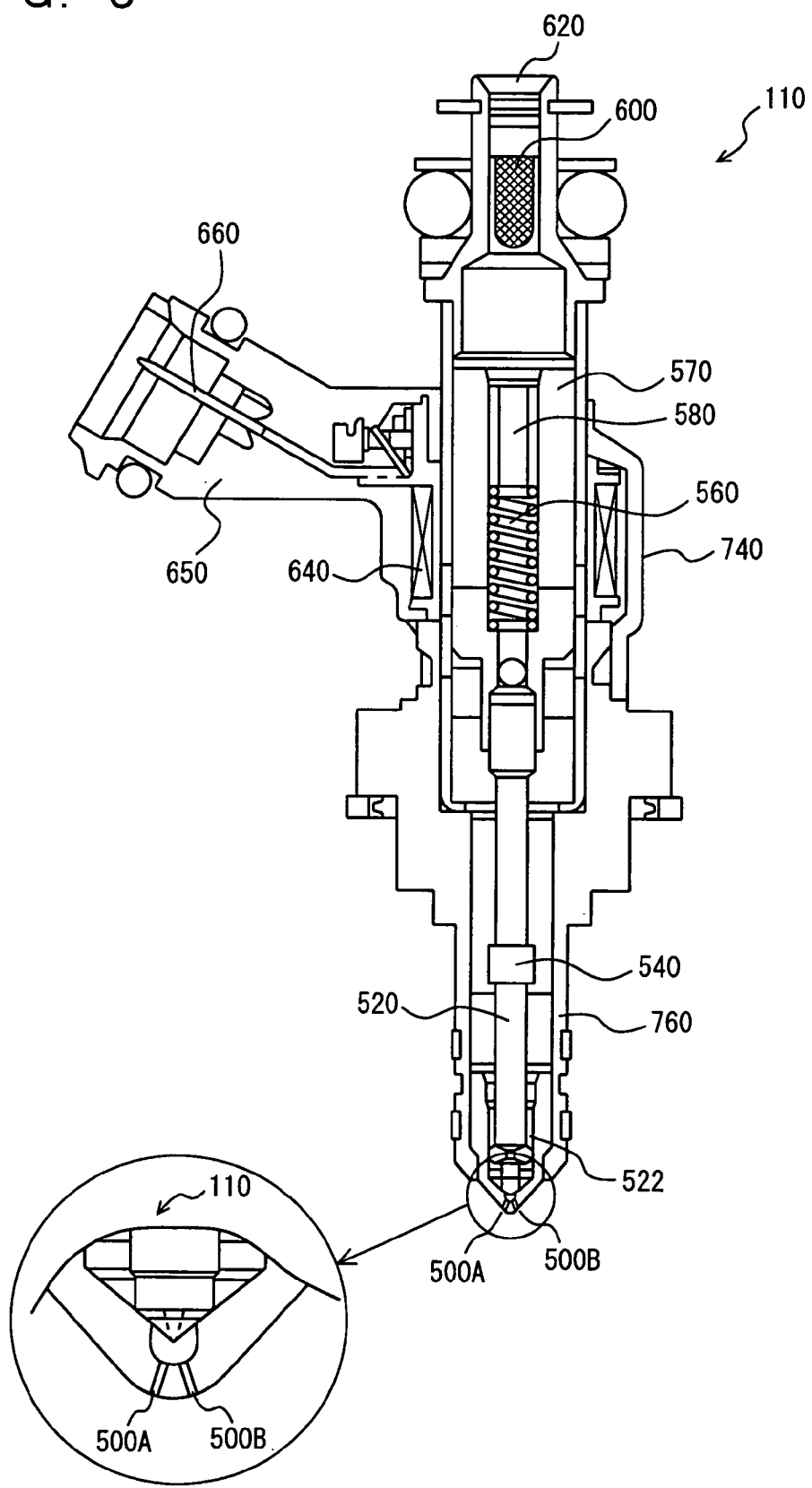
FIG. 5 is a cross-sectional view of an in-cylinder injector.

Referring to FIG. 5, in-cylinder injector 110 will be described. FIG. 5 is a longitudinal cross-sectional view of in-cylinder injector 110.

As shown in FIG. 5, in-cylinder injector 110 has a nozzle body 760 in a lower end of its main body 740, and nozzle body 760 is fixed by a nozzle holder with a spacer being interposed. Nozzle body 760 has an injection hole 500A and an injection hole 500B formed in its lower end, and a needle 520 is arranged in nozzle body 760 in a manner movable in the up-down direction. An upper end of needle 520 abuts on a core 540 which is slidable within main body 740. A spring 560 energizes needle 520 downward via core 540. Needle 520 is seated on an inner circumferential seat surface 522 of nozzle body 760, and consequently injection hole 500A and injection hole 500B are closed in a normal state.

A sleeve 570 is inserted in and fixed to the upper end of main body 740. A fuel passage 580 is formed in sleeve 570. Fuel passage 580 communicates, in its lower end, to the inside of nozzle body 760 through the passage in main body 740, so that the fuel is injected from injection hole 500A and injection hole 500B when needle 520 is lifted. The upper end of fuel passage 580 is connected to a fuel introduction port 620 through a filter 600, which is in turn connected to fuel delivery pipe 130 in FIG. 1.

An electromagnetic solenoid 640 is arranged so as to surround the lower end portion of sleeve 570 within main body 740. While a current is fed to solenoid 640, core 540 is lifted against spring 560, needle 520 is lifted as a result of a fuel pressure, and injection hole 500A and injection hole 500B are opened, whereby fuel injection is performed. Solenoid 640 is taken out to a wire 660 within an insulating housing 650, so that solenoid 640 can receive an electric signal for valve opening from engine ECU 300. If engine ECU 300 does not output the electric signal for valve opening, fuel injection from in-cylinder injector 110 is not performed.

Fuel injection timing and a fuel injection period of in-cylinder injector 110 are controlled by the electric signal for valve opening received from engine ECU 300. The fuel injection period is controlled so as to regulate an amount of fuel injection from in-cylinder injector 110. In other words, the electric signal may be used to control fuel injection also in order to achieve fuel injection of a small amount (in a region not smaller than a minimum fuel injection amount). It is noted that an EDU (Electronic Driver Unit) may be provided between engine ECU 300 and in-cylinder injector 110 for such control. It is noted that the pressure of fuel supplied to in-cylinder injector 110 structured as above is very high (approximately 13 MPa).

Figure 6:
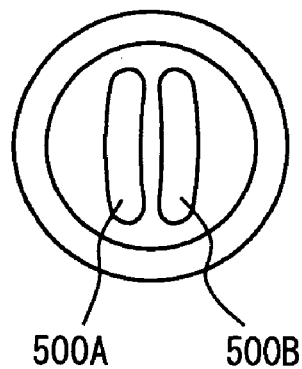
FIG. 6 is a cross-sectional view of an injection hole of the in-cylinder injector.
Figure 7:
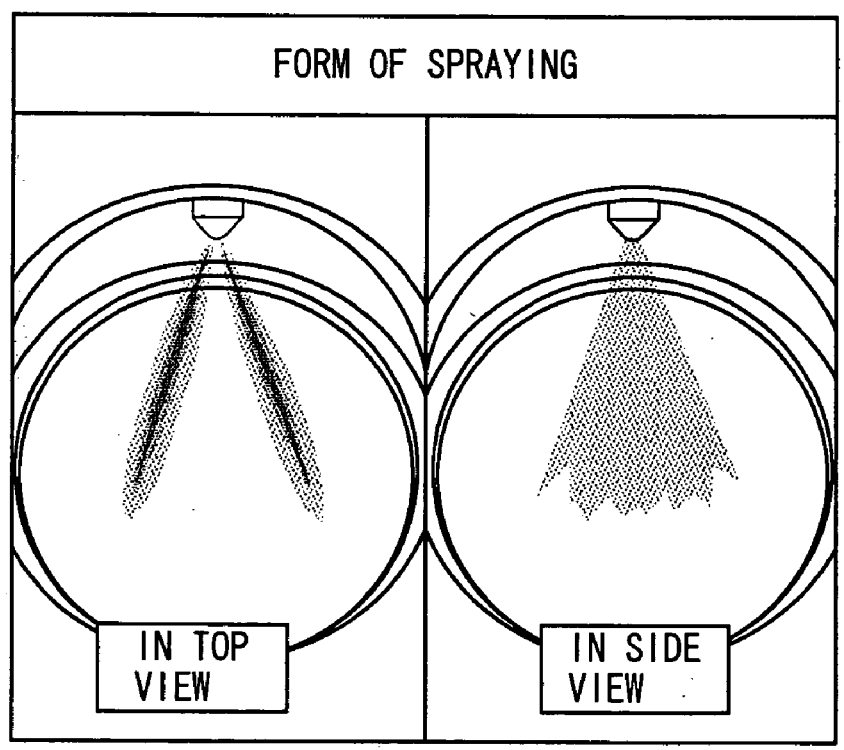
FIG. 7 illustrates a shape of spray from the in-cylinder injector.

FIG. 6 shows injection hole 500A and injection hole 500B viewed from the inside of in-cylinder injector 110. As shown in FIG. 6, injection holes in an oblong slit shape are formed in parallel to each other (oblong W slits). The fuel injected through injection hole 500A and injection hole 500B spreads in an inverted V-shape when viewed from above, as shown in FIG. 7, with spark plug 119 provided between two prongs. In addition, the fuel injected through injection hole 500A and injection hole 500B spreads in a shape of a sector spread in directions both up and down when viewed from the side, as shown in FIG. 7.

When viewed from above, spark plug 119 is provided between the two prongs. Therefore, restrained atomization resulting from impinging of the spray on spark plug 119 can be avoided. Meanwhile, when viewed from the side, the spray is in a shape of a sector spread in both up and down directions, and the recess formed by a gently curved contour is provided in the top portion of piston 123. When the piston has a flat top surface, the fuel injected from in-cylinder injector 110 adheres to that flat surface and atomization is prevented. Such restrained atomization, however, is avoided by means of the recess.

It is noted that the shape of the spray may be:

1) in a sector containing spark plug 119 when viewed from above (when viewed two-dimensionally) and in a sector when viewed from the side;

2) in a sector containing spark plug 119 when viewed from above and in a sector of only upper half when viewed from the side; 3) in a sector containing spark plug 119 when viewed from above and in a sector of only lower half when viewed from the side; or 4) in a sector containing spark plug 119 when viewed from the side.

Alternatively, the shape of the injection hole for achieving such a spray shape is not limited to the oblong W slits shown in FIG. 4. The injection hole may be implemented by an oblong S (single) slit, a T-shaped slit, or a cross-shaped slit.

Figure 8:
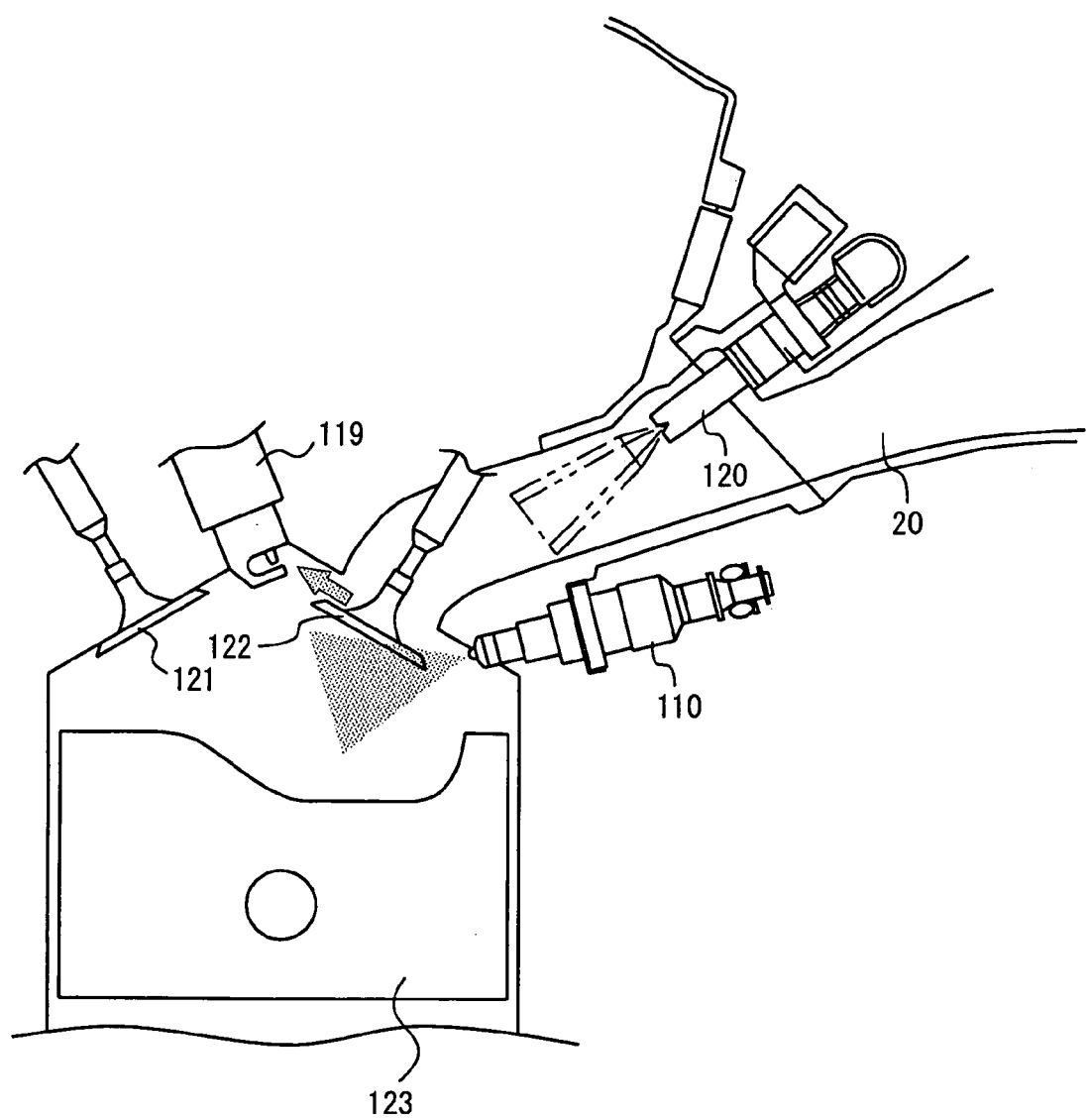
FIG. 8 shows how the fuel injected through the in-cylinder injector and thus sprayed interferes with the intake valve.

With reference to FIG. 8 how the fuel injected through in-cylinder injector 110 and sprayed, and interfering with intake valve 122 scatters, will be described.

As shown in the Figure, when in-cylinder injector 110 injects fuel at the intake stroke, the fuel interferes with (or impinges on) the back side of the flared head of intake valve 122 and is then directed toward spark plug 119, as indicated by an arrow. This can cause spark plug 119 to smolder. To address this, in the present embodiment, engine ECU 300 controls in-cylinder injector 110 to inject and thus spray fuel to avoid interfering with intake valve 122.

Figure 9:
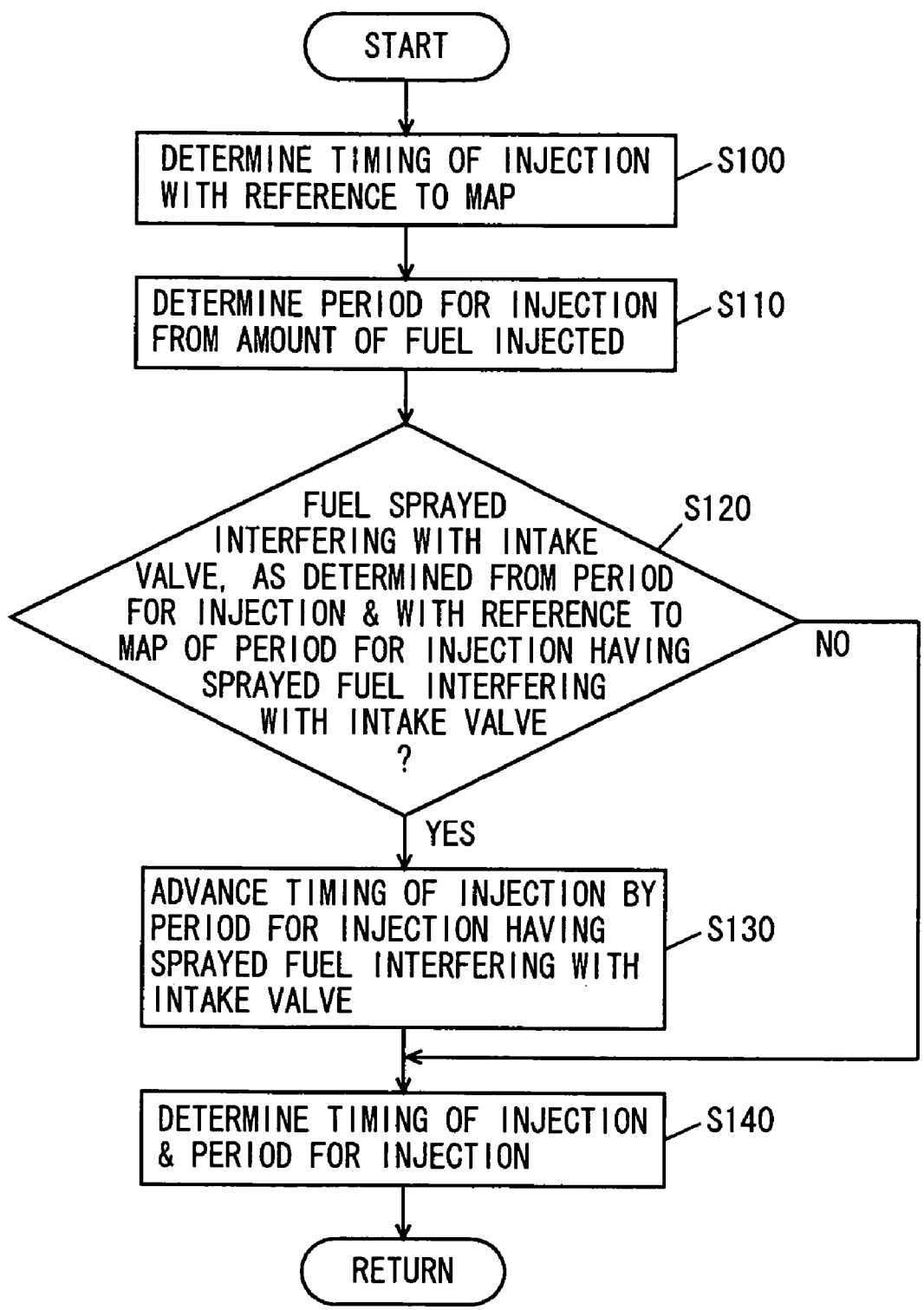
FIGS. 9-10 are flowcharts each representing a structure of a program executed by the engine ECU of FIG. 1 for control.

With reference to FIG. 9, in the present embodiment, engine ECU 300 controlling engine 10 executes a program having a structure for control, as will be described hereinafter.

At step (S) 100 engine ECU 300 determines a timing of injection through in-cylinder injector 110 in accordance with a map, which is defined for example by engine speed NE and load factor KL, although it is not limited thereto.

At S110 engine ECU 300 determines a period for injection from an amount of the fuel injected and thus supplied through in-cylinder injector 110 to the combustion chamber. Note that engine ECU 300 calculates a ratio of an amount of fuel injected through in-cylinder injector 110 (i.e., a DI ratio r) relative to a total amount of fuel injected (i.e., an amount of fuel injected through in-cylinder injector 110 plus that of fuel injected through intake manifold injector 120), and calculates amount of fuel injected through in-cylinder injector 110 apart from S110. How in-cylinder and intake manifold injectors 110 and 120 bare shares, respectively, of injecting fuel, will more specifically be described later.

At S120 engine ECU 300 determines from the determined timing of injection and a map of a period for injection for which the sprayed fuel interferes with intake valve 122, the map being defined for example by engine speed NE and load factor KL, although it is not limited thereto, whether the fuel injected through in-cylinder injector 110 and thus sprayed interferes with intake valve 122. If so, (YES at S120) the process proceeds with S130. Otherwise (NO at S120) the process proceeds with S140.

At S130 engine ECU 300 advances the timing of injection by the period for injection for which the sprayed fuel interferes with the valve. At S140 engine ECU 300 determines a timing of injection through in-cylinder injector 110 and a period for injection therethrough.

In accordance with the configuration and flow chart as described above, engine 10 in the present embodiment operates as described hereinafter.

When engine 10 is in operation, at intervals of time as predetermined (or for each cycle including fuel injection once) a timing of injection of fuel through in-cylinder injector 110 is determined from the map (S100). From an amount of fuel injected through in-cylinder injector 110 that is calculated as based on DI ratio r indicating a fuel injection ratio of in-cylinder injector 110 a period for which in-cylinder injector 110 injects fuel is determined with fuel pressure and the like considered (S110).

From the determined period for injection and the map of the period for injection for which sprayed fuel interferes with intake valve 122, a decision is made as to whether the fuel injected through in-cylinder injector 110 and thus sprayed interferes with intake valve 122 (S120). If so, (YES at S120) the timing of injection is advanced by the period for injection having the sprayed fuel interfering with the valve (S130).

This allows a timing of injection to be advanced by a period of time having sprayed fuel interfering with the valve, i.e., in-cylinder injector 110 to be timed to inject fuel earlier to avoid interfering with intake valve 122. Thus the interference can be avoided and spark plug 119 can be prevented from having fuel scattered therearound and causing spark plug 119 to smolder.

Thus the present embodiment can provide an engine and an engine ECU so that if a decision is made that fuel injected through an in-cylinder injector and thus sprayed interferes with an intake valve to cause a spark plug to smolder, the in-cylinder injector can be timed to inject the fuel earlier by a period for injection having this sprayed fuel interfering with the valve. Thus the interference can be avoided and as a result the spark plug can also be prevented from smoldering.

In the above flowchart, S130 may be provided as follows:

1) If in-cylinder injector 110 is timed to inject fuel earlier, smoke or the like may be caused. Accordingly, in-cylinder injector 110 is timed to divide the injection of the fuel at least in two times to inject and thus spray the fuel to avoid interfering with intake valve 122.

2) In-cylinder injector 110 is timed to inject fuel earlier by a period for injection having sprayed fuel interfering with intake valve 122 and intake manifold intake 120 injects fuel by the shortfall to prevent in-cylinder injector 110 from injecting and thus spraying fuel interfering with intake valve 122. To do so, an injection ratio (or DI ratio r) will be changed.

3) To prevent the fuel injected through in-cylinder injector 110 and thus sprayed from interfering with intake valve 122, a variable valve timing mechanism or the like is employed to time intake valve 122 to open later (after in-cylinder injector 110 completely injects the fuel) to prevent the interference. Alternatively, a variable valve lifting mechanism may be employed to vary the intake valve in liftability to prevent the interference.

<Exemplary Variation>

Hereinafter the present embodiment will be described in an exemplary variation. More specifically, a process different from that of FIG. 9 is employed to determine whether fuel injected through in-cylinder injector 110 and thus sprayed interferes with intake valve 122. The present exemplary variation employs the same hardware configuration as described in the previous embodiment.

Figure 10:
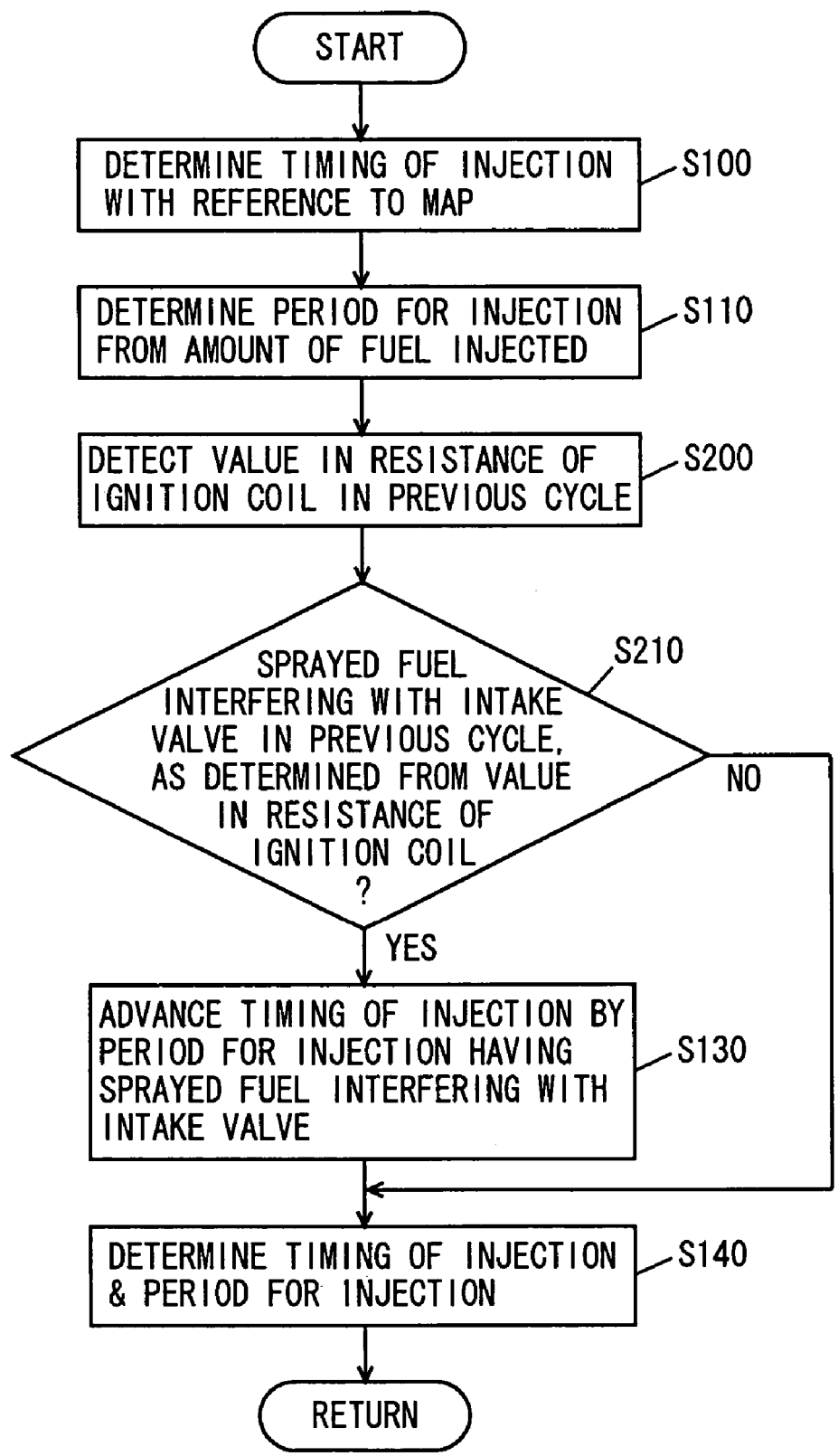

With reference to FIG. 10, in the present exemplary variation, engine 10 is controlled by engine ECU 300 executing a program having a structure for control, as will be described hereinafter. In the FIG. 10 flowchart the steps identical to those of the FIG. 9 flowchart are identically labeled.

At S200 engine ECU 300 detects a value in resistance of an ignition coil in a previous cycle. Note that an intake stroke, a compression stroke, a combustion and expansion stroke, and an exhaust stroke together form one cycle. Spark plug 119 has a value in (insulation) resistance between two electrodes (or the ignition coil has a value in resistance) varying because spark plug 119 in a vicinity of the two electrodes has a product attributed to incomplete combustion adhering thereto, i.e., smolders and thus soiled and damaged. If the two electrodes have larger amounts of such product adhering thereto, the spark plug more smolders and hence more soiled and damaged, resulting in reduced values in (insulation) resistance between the two electrodes. This can prevent normal spark discharging.

At S210 engine ECU 300 determines from the value in resistance of the ignition coil to determine whether the previous cycle has sprayed fuel interfering with the valve. If the ignition coil's value in resistance is smaller than a predetermined threshold value, it indicates that sprayed fuel interferes with the valve and the spark plug smolders and as a result the spark coil's value in resistance has decreased. If a decision is made that sprayed fuel interferes with the valve in the previous cycle (YES at S210) the process proceeds to S130. Otherwise (NO at S210) the process proceeds to S140.

Thus in the present exemplary variation whether fuel injected through in-cylinder injector 110 and thus sprayed interferes with intake valve 112 can be determined from how an ignition coil for a spark plug varies in resistance. Such process is repeated and if the ignition coil does not have a normal value in resistance, the interference is avoided as controlled. More specifically, a feedback is provided to avoid the interference and in-cylinder injector 110, intake valve 122 and the like are controlled until the interference is avoided (or the value in resistance attains the normal value).

<Engine (1) to Which Present Control Device is Suitably Adapted>

An engine (1) to which the control device of the present embodiment is suitably adapted will now be described.

Figure 11:
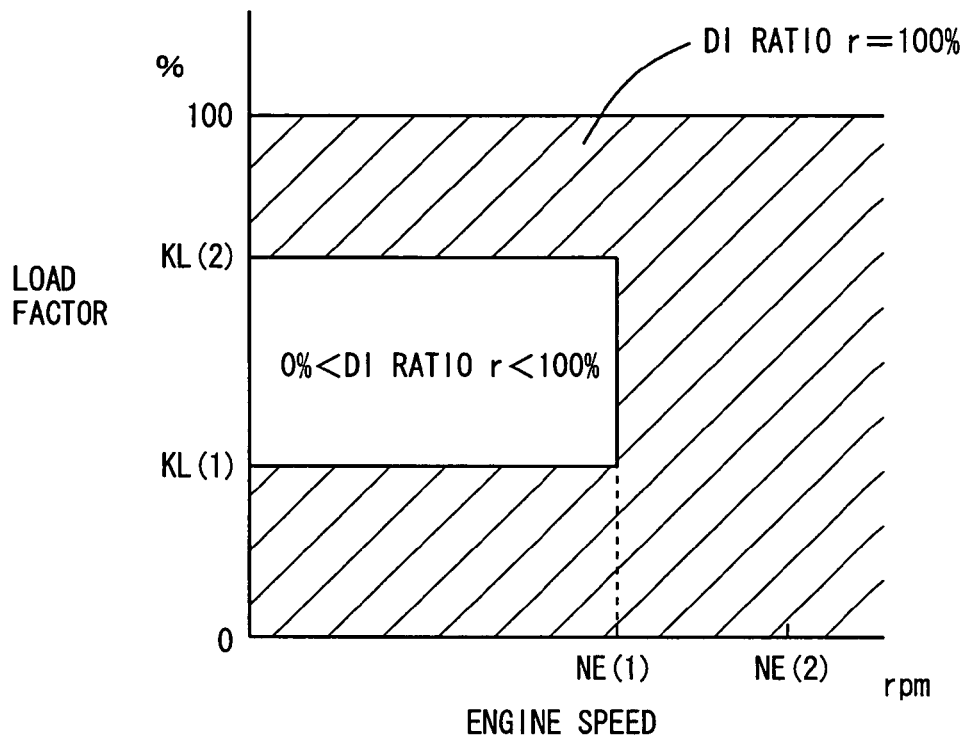
FIGS. 11 and 12 illustrate first DI ratio maps in a warm state and a cold state respectively, of an engine to which the control device according to the embodiment of the present invention is suitably adapted.
Figure 12:
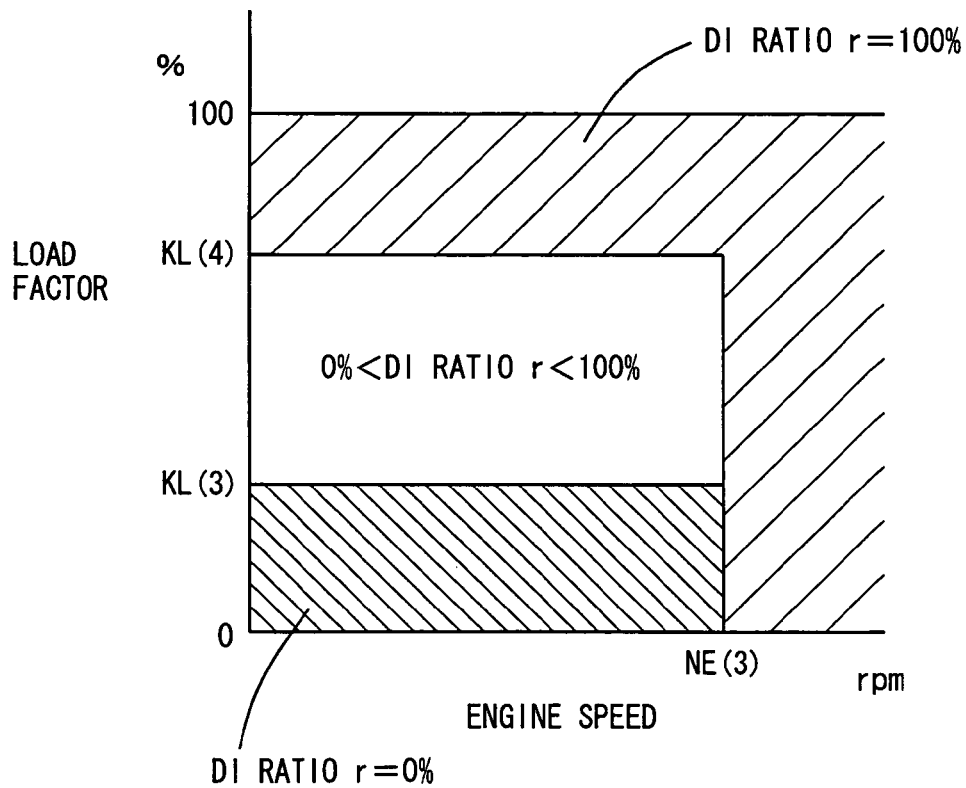

Referring to FIGS. 11 and 12, maps each indicating a fuel injection ratio between in-cylinder injector 110 and intake manifold injector 120 (hereinafter, also referred to as a DI ratio (r)), identified as information associated with an operation state of engine 10, will now be described. The maps are stored in ROM 320 of engine ECU 300. FIG. 11 is the map for a warm state of engine 10, and FIG. 12 is the map for a cold state of engine 10.

In the maps illustrated in FIGS. 11 and 12, with the horizontal axis representing an engine speed of engine 10 and the vertical axis representing a load factor, the fuel injection ratio of in-cylinder injector 110, or the DI ratio r, is expressed in percentage.

As shown in FIGS. 11 and 12, the DI ratio r is set for each operation region that is determined by the engine speed and the load factor of engine 10. "DI RATIO r=100%" represents the region where fuel injection is carried out using only in-cylinder injector 110, and "DI RATIO r=0%" represents the region where fuel injection is carried out using only intake manifold injector 120. "DI RATIO r # 0%", "DI RATIO r≠ 100%" and "0%<DI RATIO r<100%" each represent the region where fuel injection is carried out using both in-cylinder injector 110 and intake manifold injector 120. Generally, in-cylinder injector 110 contributes to an increase of output performance, while intake manifold injector 120 contributes to uniformity of the air-fuel mixture. These two kinds of injectors having different characteristics are appropriately selected depending on the engine speed and the load factor of engine 10, so that only homogeneous combustion is conducted in the normal operation state of engine 10 (other than the abnormal operation state such as a catalyst warm-up state during idling).

Further, as shown in FIGS. 11 and 12, the fuel injection ratio between in-cylinder injector 110 and intake manifold injector 120, or the DI ratio r, is defined individually in the map for the warm state and in the map for the cold state of the engine. The maps are configured to indicate different control regions of in-cylinder injector 110 and intake manifold injector 120 as the temperature of engine 10 changes. When the temperature of engine 10 detected is equal to or higher than a predetermined temperature threshold value, the map for the warm state shown in FIG. 11 is selected; otherwise, the map for the cold state shown in FIG. 12 is selected. One or both of in-cylinder injector 110 and intake manifold injector 120 are controlled based on the selected map and according to the engine speed and the load factor of engine 10.

The engine speed and the load factor of engine 10 set in FIGS. 11 and 12 will now be described. In FIG. 11, NE(1) is set to 2500 rpm to 2700 rpm, KL(1) is set to 30% to 50%, and KL(2) is set to 60% to 90%. In FIG. 12, NE(3) is set to 2900 rpm to 3100 rpm. That is, NE(1)<NE(3). NE(2) in FIG. 11 as well as KL(3) and KL(4) in FIG. 12 are also set as appropriate.

When comparing FIG. 11 and FIG. 12, NE(3) of the map for the cold state shown in FIG. 12 is greater than NE(1) of the map for the warm state shown in FIG. 11. This shows that, as the temperature of engine 10 is lower, the control region of intake manifold injector 120 is expanded to include the region of higher engine speed. That is, in the case where engine 10 is cold, deposits are unlikely to accumulate in the injection hole of in-cylinder injector 110 (even if the fuel is not injected from in-cylinder injector 110). Thus, the region where the fuel injection is to be carried out using intake manifold injector 120 can be expanded, to thereby improve homogeneity.

When comparing FIG. 11 and FIG. 12, "DI RATIO r=100%" in the region where the engine speed of engine 10 is NE(1) or higher in the map for the warm state, and in the region where the engine speed is NE(3) or higher in the map for the cold state. In terms of load factor, "DI RATIO r=100%" in the region where the load factor is KL(2) or greater in the map for the warm state, and in the region where the load factor is KL(4) or greater in the map for the cold state. This means that in-cylinder injector 110 solely is used in the region of a predetermined high engine speed, and in the region of a predetermined high engine load. That is, in the high speed region or the high load region, even if fuel injection is carried out using only in-cylinder injector 110, the engine speed and the load of engine 10 are high, ensuring a sufficient intake air quantity, so that it is readily possible to obtain a homogeneous air-fuel mixture even using only in-cylinder injector 110. In this manner, the fuel injected from in-cylinder injector 110 is atomized within the combustion chamber involving latent heat of vaporization (or, absorbing heat from the combustion chamber). Thus, the temperature of the air-fuel mixture is decreased at the compression end, whereby antiknock performance is improved. Further, since the temperature within the combustion chamber is decreased, intake efficiency improves, leading to high power output.

In the map for the warm state in FIG. 11, fuel injection is also carried out using only in-cylinder injector 110 when the load factor is KL(1) or less. This shows that in-cylinder injector 110 alone is used in a predetermined low load region when the temperature of engine 10 is high. When engine 10 is in the warm state, deposits are likely to accumulate in the injection hole of in-cylinder injector 110. However, when fuel injection is carried out using in-cylinder injector 110, the temperature of the injection hole can be lowered, whereby accumulation of deposits is prevented. Further, clogging of in-cylinder injector 110 may be prevented while ensuring the minimum fuel injection quantity thereof. Thus, in-cylinder injector 110 alone is used in the relevant region.

When comparing FIG. 11 and FIG. 12, there is a region of "DI RATIO r=0%" only in the map for the cold state in FIG. 12. This shows that fuel injection is carried out using only intake manifold injector 120 in a predetermined low load region (KL(3) or less) when the temperature of engine 10 is low. When engine 10 is cold and low in load and the intake air quantity is small, atomization of the fuel is unlikely to occur. In such a region, it is difficult to ensure favorable combustion with the fuel injection from in-cylinder injector 110. Further, particularly in the low-load and low-speed region, high output using in-cylinder injector 110 is unnecessary. Accordingly, fuel injection is carried out using only intake manifold injector 120, rather than in-cylinder injector 110, in the relevant region.

Further, in an operation other than the normal operation, or in the catalyst warm-up state during idling of engine 10 (abnormal operation state), in-cylinder injector 110 is controlled to carry out stratified charge combustion. By causing the stratified charge combustion only during the catalyst warm-up operation, warming up of the catalyst is promoted, and exhaust emission is thus improved.

<Engine (2) to which Present Control Device is Suitably Adapted>

Hereinafter, an engine (2) to which the control device of the present embodiment is suitably adapted will be described. In the following description of the engine (2), the configurations similar to those of the engine (1) will not be repeated.

Figure 13:
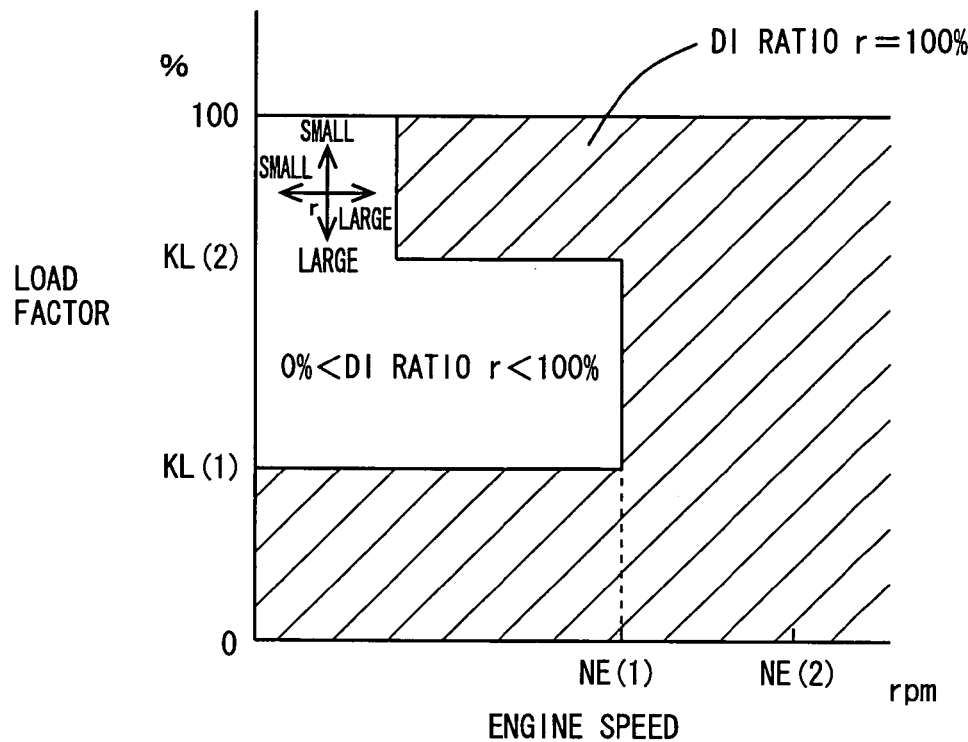
FIGS. 13 and 14 illustrate second DI ratio maps in a warm state and a cold state respectively, of an engine to which the control device according to the embodiment of the present invention is suitably adapted.
Figure 14:
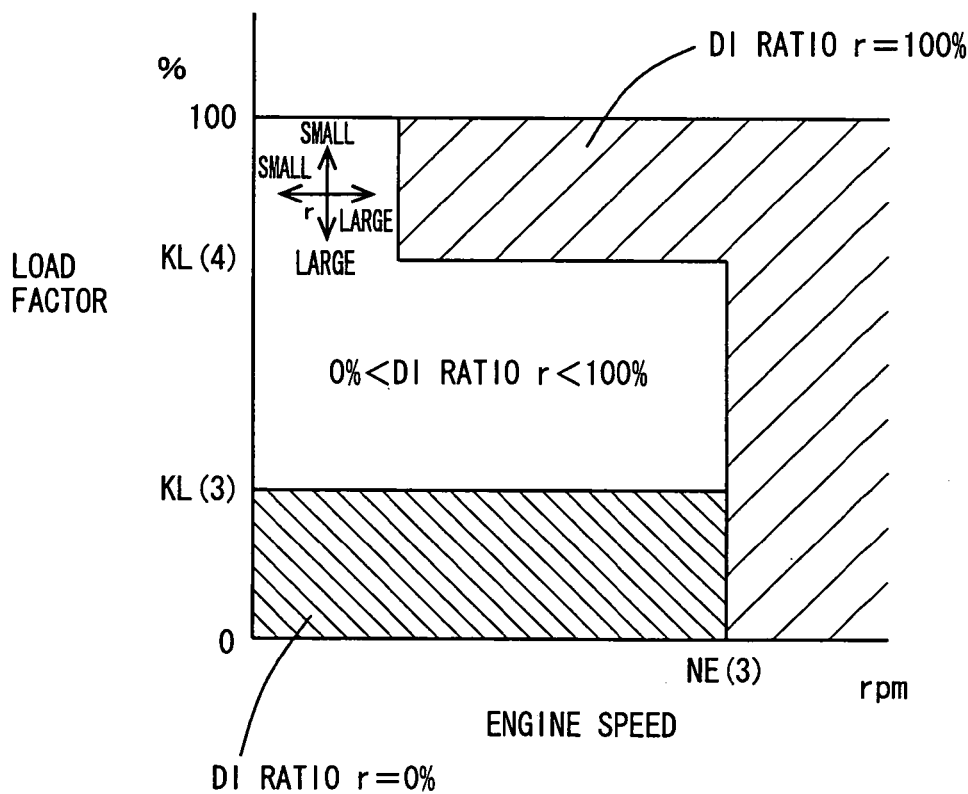

Referring to FIGS. 13 and 14, maps each indicating the fuel injection ratio between in-cylinder injector 110 and intake manifold injector 120, identified as information associated with the operation state of engine 10, will be described. The maps are stored in ROM 320 of engine ECU 300. FIG. 13 is the map for the warm state of engine 10, and FIG. 14 is the map for the cold state of engine 10.

FIGS. 13 and 14 differ from FIGS. 11 and 12 in the following points. "DI RATIO r=100%" holds in the region where the engine speed of engine 10 is equal to or higher than NE(1) in the map for the warm state, and in the region where engine 10 speed is NE(3) or higher in the map for the cold state. Further, except for the low-speed region, "DI RATIO r=100%" holds in the region where the load factor is KL(2) or greater in the map for the warm state, and in the region where the load factor is KL(4) or greater in the map for the cold state. This means that fuel injection is carried out using only in-cylinder injector 110 in the region where the engine speed is at a predetermined high level, and that fuel injection is often carried out using only in-cylinder injector 110 in the region where the engine load is at a predetermined high level. However, in the low-speed and high-load region, mixing of an air-fuel mixture formed by the fuel injected from in-cylinder injector 110 is poor, and such inhomogeneous air-fuel mixture within the combustion chamber may lead to unstable combustion. Thus, the fuel injection ratio of in-cylinder injector 110 is increased as the engine speed increases where such a problem is unlikely to occur, whereas the fuel injection ratio of in-cylinder injector 110 is decreased as the engine load increases where such a problem is likely to occur. These changes in the DI ratio r are shown by crisscross arrows in FIGS. 13 and 14. In this manner, variation in output torque of the engine attributable to the unstable combustion can be suppressed. It is noted that these measures are approximately equivalent to the measures to decrease the fuel injection ratio of in-cylinder injector 110 as the state of engine 10 moves toward the predetermined low speed region, or to increase the fuel injection ratio of in-cylinder injector 110 as engine 10 state moves toward the predetermined low load region. Further, except for the relevant region (indicated by the crisscross arrows in FIGS. 13 and 14), in the region where fuel injection is carried out using only in-cylinder injector 110 (on the high speed side and on the low load side), a homogeneous air-fuel mixture is readily obtained even when the fuel injection is carried out using only in-cylinder injector 110. In this case, the fuel injected from in-cylinder injector 110 is atomized within the combustion chamber involving latent heat of vaporization (by absorbing heat from the combustion chamber). Accordingly, the temperature of the air-fuel mixture is decreased at the compression end, and thus, the antiknock performance improves. Further, with the temperature of the combustion chamber decreased, intake efficiency improves, leading to high power output.

In engine 10 explained in conjunction with FIGS. 11-14, homogeneous combustion is achieved by setting the fuel injection timing of in-cylinder injector 110 in the intake stroke, while stratified charge combustion is realized by setting it in the compression stroke. That is, when the fuel injection timing of in-cylinder injector 110 is set in the compression stroke, a rich air-fuel mixture can be located locally around the spark plug, so that a lean air-fuel mixture in the combustion chamber as a whole is ignited to realize the stratified charge combustion. Even if the fuel injection timing of in-cylinder injector 110 is set in the intake stroke, stratified charge combustion can be realized if it is possible to provide a rich air-fuel mixture locally around the spark plug.

As used herein, the stratified charge combustion includes both the stratified charge combustion and semi-stratified charge combustion. In the semi-stratified charge combustion, intake manifold injector 120 injects fuel in the intake stroke to generate a lean and homogeneous air-fuel mixture in the whole combustion chamber, and then in-cylinder injector 110 injects fuel in the compression stroke to generate a rich air-fuel mixture around the spark plug, so as to improve the combustion state. Such semi-stratified charge combustion is preferable in the catalyst warm-up operation for the following reasons. In the catalyst warm-up operation, it is necessary to considerably retard the ignition timing and maintain a favorable combustion state (idle state) so as to cause a high-temperature combustion gas to reach the catalyst. Further, a certain quantity of fuel needs to be supplied. If the stratified charge combustion is employed to satisfy these requirements, the quantity of the fuel will be insufficient. If the homogeneous combustion is employed, the retarded amount for the purpose of maintaining favorable combustion is small compared to the case of stratified charge combustion. For these reasons, the above-described semi-stratified charge combustion is preferably employed in the catalyst warm-up operation, although either of stratified charge combustion and semi-stratified charge combustion may be employed.

Further, in the engine explained in conjunction with FIGS. 11-14, the fuel injection timing of in-cylinder injector 110 is set in the intake stroke in a basic region corresponding to the almost entire region (here, the basic region refers to the region other than the region where semi-stratified charge combustion is carried out with fuel injection from intake manifold injector 120 in the intake stroke and fuel injection from in-cylinder injector 110 in the compression stroke, which is carried out only in the catalyst warm-up state). The fuel injection timing of in-cylinder injector 110, however, may be set temporarily in the compression stroke for the purpose of stabilizing combustion, for the following reasons.

When the fuel injection timing of in-cylinder injector 110 is set in the compression stroke, the air-fuel mixture is cooled by the injected fuel while the temperature in the cylinder is relatively high. This improves the cooling effect and, hence, the antiknock performance. Further, when the fuel injection timing of in-cylinder injector 110 is set in the compression stroke, the time from the fuel injection to the ignition is short, which ensures strong penetration of the injected fuel, so that the combustion rate increases. The improvement in antiknock performance and the increase in combustion rate can prevent variation in combustion, and thus, combustion stability is improved.

Regardless of the temperature of engine 10 (that is, whether engine 10 is in the warm state or in the cold state), the warm state map shown in FIG. 11 or 13 may be used during idle-off state (when an idle switch is off, or when the accelerator pedal is pressed). (Regardless of whether the engine is in the warm or cold state, in-cylinder injector 110 is employed for the low lord range.)

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control device for an internal combustion engine including a fuel injection mechanism injecting fuel into a cylinder, comprising:
   an injection controller controlling said fuel injection mechanism to inject the fuel into said cylinder at an intake stroke, as corresponding to a prescribed state of operation associated with said internal combustion engine;

a valve controller controlling at least one of a timing to open and close an intake valve, a period of time for which said intake valve is opened/closed, and said intake valve's liftability;

a determinator determining whether the fuel injected through said fuel injection mechanism and thus sprayed interferes with said intake valve and scatters in a vicinity of a spark plug; and a modifier operative in response to said determinator making a decision that the fuel has scattered in the vicinity of said spark plug to allow said injection controller to modify a manner of injecting the fuel and/or to allow said valve controller to modify a manner of operating said intake valve to prevent the fuel sprayed from interfering with said intake valve.

2. The control device according to claim 1, wherein said modifier allows said injection controller to modify a timing of injection of the fuel to modify said manner of injecting the fuel.

3. The control device according to claim 2, wherein said modifier advances said timing of injection of the fuel.

4. The control device according to claim 1, wherein said modifier allows said injection controller to divide injecting the fuel at least in two times to modify said manner of injecting the fuel.

5. The control device according to claim 1, wherein:
said internal combustion engine further includes a fuel injection mechanism injecting the fuel into an intake manifold; and
said modifier allows said injection controller to reduce a period for injecting the fuel and if reducing said period results in failing to satisfy an amount of fuel required then said modifier modifies said manner of injecting the fuel by allowing said fuel injection mechanism injecting the fuel into said intake manifold to inject fuel by a shortfall.

6. The control device according to claim 5, wherein:
said fuel injection mechanism injecting the fuel into said cylinder is an in-cylinder injector; and
said fuel injection mechanism injecting the fuel into said intake manifold is an intake manifold injector.

7. The control device according to claim 1, wherein said modifier allows said valve controller to modify said timing to open and close said intake valve to modify said manner of injecting the fuel.

8. The control device according to claim 7, wherein said modifier allows said intake valve to be timed to open later.

9. The control device according to claim 1, wherein said determinator determines whether the fuel sprayed has scattered in the vicinity of the spark plug with reference to a map represented by a parameter representing a state of operation of said internal combustion engine.

10. The control device according to claim 1, wherein an electrical characteristic of said spark plug is detected and if said electrical characteristic varies from a normal state said determinator determines whether the fuel sprayed has scattered in the vicinity of said spark plug.

11. The control device according to claim 10, wherein said modifier modifies at least one of said manner of injecting the fuel and said manner of operating said intake valve until said electrical characteristic no longer varies, as detected.

12. A control device for an internal combustion engine including fuel injection means for injecting fuel into a cylinder, comprising:
injection control means for controlling said fuel injection means to inject the fuel into said cylinder at an intake stroke, as corresponding to a prescribed state of operation associated with said internal combustion engine;

valve control means for controlling at least one of a timing to open and close an intake valve, a period of time for which said intake valve is opened/closed, and said intake valve's liftability;

determination means for determining whether the fuel injected through said fuel injection means and thus sprayed interferes with said intake valve and scatters in a vicinity of a spark plug; and modification means operative in response to said determination means making a decision that the fuel has scattered in the vicinity of said spark plug for allowing said injection control means to modify a manner of injecting the fuel and/or allowing said valve control means to modify a manner of operating said intake valve to prevent the fuel sprayed from interfering with said intake valve.

13. The control device according to claim 12, wherein said modification means includes means for allowing said injection control means to modify a timing of injection of the fuel to modify said manner of injecting the fuel.

14. The control device according to claim 13, wherein said modification means includes means for advancing said timing of injection of the fuel.

15. The control device according to claim 12, wherein said modification means includes means for allowing said injection control means to divide injecting the fuel at least in two times to modify said manner of injecting the fuel.

16. The control device according to claim 12, wherein:
said internal combustion engine further includes fuel injection means for injecting the fuel into an intake manifold; and
said modification means includes means for allowing said injection control means to reduce a period for injecting the fuel and, if reducing said period results in failing to satisfy an amount of fuel required, then causing said fuel injection means for injecting the fuel into said intake manifold to inject fuel by a shortfall to modify said manner of injecting the fuel.

17. The control device according to claim 16, wherein:
said fuel injection means for injecting the fuel into said cylinder is an in-cylinder injector; and
said fuel injection means for injecting the fuel into said intake manifold is an intake manifold injector.

18. The control device according to claim 12, wherein said modification means includes means for allowing said valve control means to modify said timing to open and close said intake valve to modify said manner of injecting the fuel.

19. The control device according to claim 18, wherein said modification means includes means for allowing said intake valve to be timed to open later.

20. The control device according to claim 12, wherein said determination means includes means for determining whether the fuel sprayed has scattered in the vicinity of the spark plug with reference to a map represented by a parameter representing a state of operation of said internal combustion engine.

21. The control device according to claim 12, wherein said determination means includes means for determining whether the fuel sprayed has scattered in the vicinity of said spark plug from a fact that an electrical characteristic of said spark plug detected varies from a normal state.

22. The control device according to claim 21, wherein said modification means includes means for modifying at least one of said manner of injecting the fuel and said manner of operating said intake valve until said electrical characteristic no longer varies, as detected.

* * * * *